United States Patent [19]

Gateau et al.

[11] Patent Number: 5,292,246
[45] Date of Patent: Mar. 8, 1994

[54] BURNER FOR THE MANUFACTURE OF SYNTHETIC GAS COMPRISING A SOLID ELEMENT WITH HOLES

[75] Inventors: Paul Gateau, Saint Nom la Breteche; Michel Maute, Les Clayes Sous Bois; Alain Feugier, Orgeval, all of France

[73] Assignee: Institut Francais du Petrole, Rueil-Malmaison, France

[21] Appl. No.: 931,134

[22] Filed: Aug. 4, 1992

Related U.S. Application Data

[63] Continuation of Ser. No. 346,225, May 2, 1989, abandoned.

[30] Foreign Application Priority Data

May 2, 1988 [FR] France .................. 88 05960

[51] Int. Cl.$^5$ .................................................. F23D 14/00
[52] U.S. Cl. .................................. 431/328; 431/326; 431/2; 431/350; 239/418; 239/422
[58] Field of Search .......... 431/350, 354, 8, 2, 431/10, 174, 178, 190, 160, 211, 207, 326, 328, 158; 239/418, 422, 548, 556, 557, 558; 422/129

[56] References Cited

U.S. PATENT DOCUMENTS

| | | | |
|---|---|---|---|
| 1,039,036 | 9/1912 | Dunham | 431/345 X |
| 1,564,363 | 12/1925 | Miller | 239/422 |
| 1,944,047 | 1/1934 | Wagner . | |
| 2,054,601 | 7/1934 | Jenkins . | |
| 2,405,465 | 8/1946 | Summerfield | 431/158 X |
| 2,531,174 | 11/1950 | Tomlin . | |
| 2,827,112 | 3/1958 | Inskeep | 431/158 X |
| 3,503,557 | 3/1970 | Hutton, Jr. | 431/158 X |
| 3,643,871 | 2/1972 | Hamernik et al. . | |
| 3,825,400 | 7/1974 | Popov | 431/160 |
| 4,650,416 | 3/1987 | Warren, Jr. et al. | 431/158 |
| 4,801,092 | 1/1989 | Webber et al. | 239/418 |
| 4,821,963 | 4/1989 | Arnout et al. | 239/419.3 |

FOREIGN PATENT DOCUMENTS 443687 3/1936 United Kingdom .

*Primary Examiner*—Carl D. Price
*Attorney, Agent, or Firm*—Antonelli, Terry, Stout & Kraus

[57] ABSTRACT

The present invention provides a burner for a reactor producing synthetic gas for conveying at least two fluids separately to a reaction zone, one serving as fuel and the other as combustive. It comprises a solid element in which are provided holes penetrating to different depths, these holes opening at one of their ends into the reactor and at the other either into fuel supply means or into combustive supply means depending on the fluid conveyed by the hole considered.

5 Claims, 4 Drawing Sheets

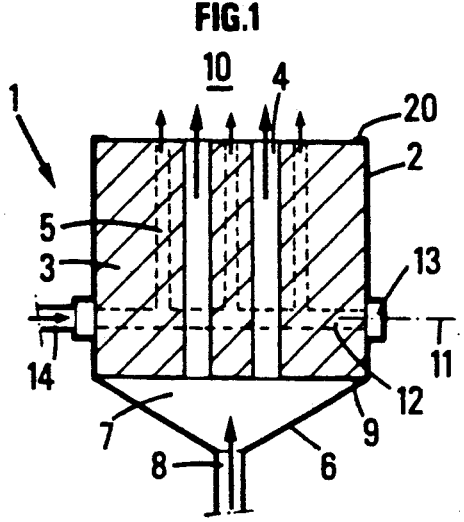
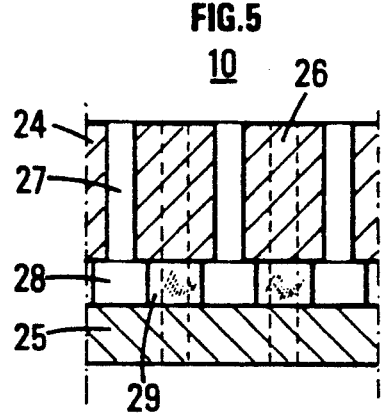
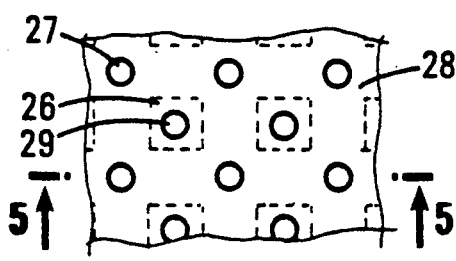
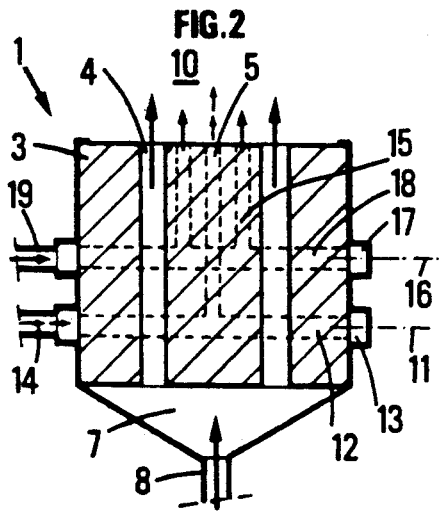
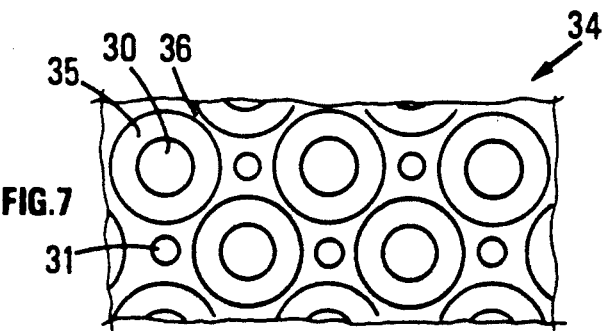
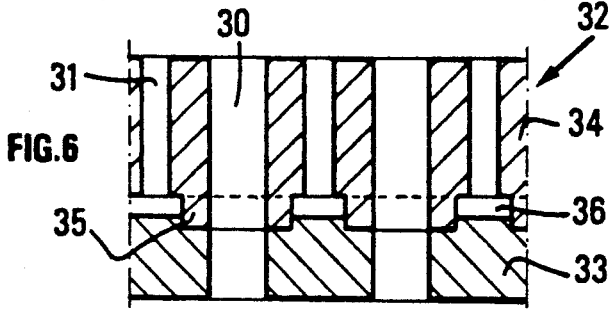
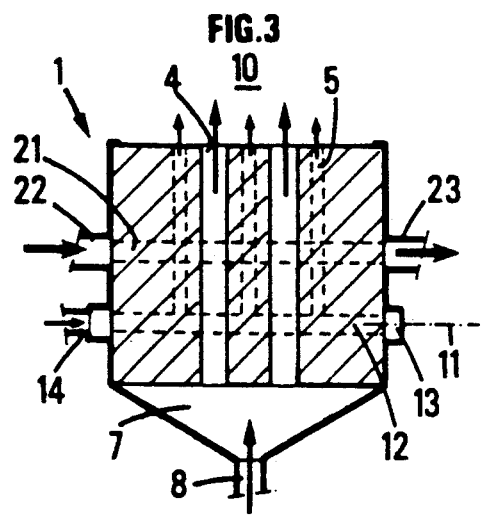
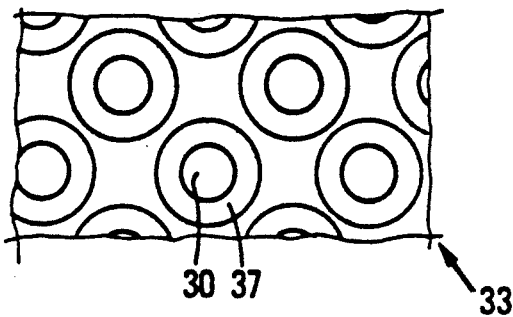

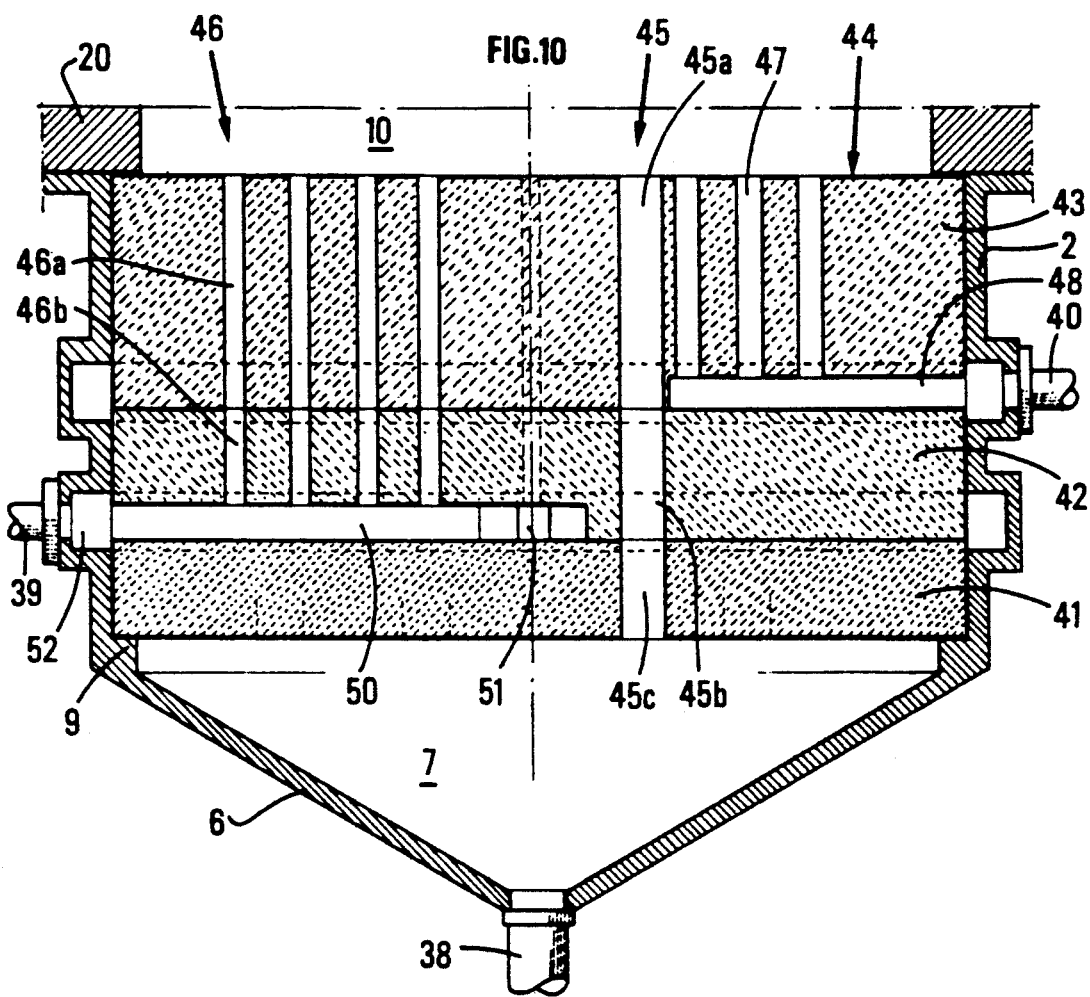
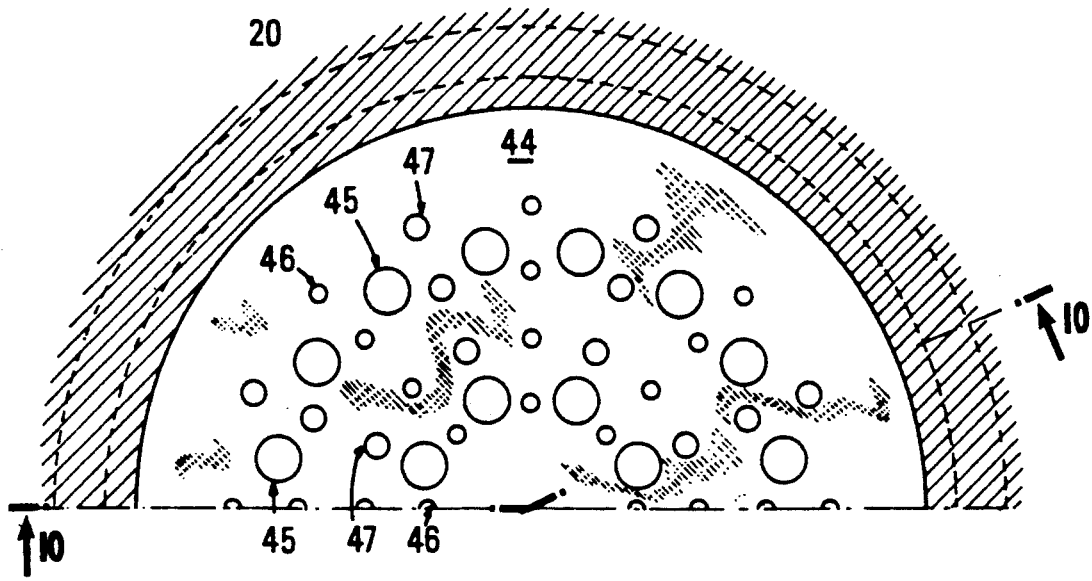

BURNER FOR THE MANUFACTURE OF SYNTHETIC GAS COMPRISING A SOLID ELEMENT WITH HOLES

This application is a continuation application of application Ser. No. 346,225, filed May 2, 1989 which is now abandoned.

BACKGROUND OF THE INVENTION

The present invention relates to a burner for a chemical reactor more particularly for the manufacture of synthetic gas i.e. synthesis gas.

This burner may convey several fluids separately into the reaction zone.

The burner of the present invention may be used more particularly in the method of partial flame oxidation of hydrocarbons, for manufacturing synthetic gas. It may be mentioned that methods of this type are already applied by Texaco, Shell, . . . By synthetic gas is meant here a mixture of $H_2$, CO, as well as $N_2$, $CO_2$, water vapor . . .

The reactor for this use is formed of a burner and a combustion chamber. The device for quenching the gas may also be an integral part of the reactor. After the combustion, a filling, catalyst or other, may also be placed in the reactor.

The burner of the present invention may be supplied by gaseous or liquid fuel or solid fuel in suspension and by a combustion sustaining means or an oxidizer, air, oxygen or enriched air. Steam may be added in variable proportions to the oxidizer or more generally to the fuel. The gases introduced may be preheated to a greater or lesser degree. The preheating increases the yield of the reactor. By way of example, optimum yield is obtained with natural gas, air and steam, for an $O_2/C$ ratio between 0.60 and 0.65 for pressurized operations. With preheating greater than 500° C., the $H_2O/C$ ratio has little influence between 0.05 and 3. It is optimum towards 1. The steam reduces the formation of soot.

For special uses, the $O_2/C$ ratio may go below 0.6 and beyond 0.65 (up to 1 for example).

Modern methods operate at pressures which may reach 80 bars.

Combustion is as a whole adiabatic.

It must provide the theoretic reaction :

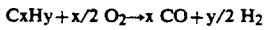

$$C_xH_y + x/2\, O_2 \rightarrow x\, CO + y/2\, H_2$$

but is always accompanied by the formation of $CO_2$ and $H_2O$ in variable proportions. Thus, the adiabatic balance temperatures may be locally exceeded. Thus, with pure oxygen, temperatures may be met locally very much greater than 1500° C.

The burners proposed are in general tubular or more complex. The simplest technology is represented by two concentric tubes. In this case, the tubes have dimensions (several tens of millimeters) very much greater than the flame front thicknesses. It is then indispensable to let an appreciably residence time elapse (about a second and more) in order to reach the thermodynamic balance. The reactor then comprises zones of high heterogeneity with recirculation of combusting gases.

The multiplicity of tubes would provide a better homogeneity but the number of tubes remains limited for industrial applications. In addition, industrial construction from ceramic remains delicate with tubes. The metal tubes receive the impacts of the hot gas recirculation nuclei and their resistance is affected thereby if there is no cooling.

SUMMARY OF THE INVENTION

The present invention provides a burner with holes which overcome these drawbacks.

The burner comprises orifices or passages opening at different depths or levels depending on the nature of the fluid which it is desired to introduce therein.

The burner may be formed in a single piece or by the juxtapositioning or superpositioning of several elements.

These elements may be made from metal, ceramic or any other refractory material.

In addition, the present invention makes it possible to readily form a large number of holes or passages whereas the use of tubes (in comparable number) is delicate.

With the present invention, a large sized burner may be formed. It also makes it possible to convey, to the reaction zone and without complication, more than two fluids to the burner nose.

This gives an additional regulation flexibility in the case of synthetic gas but may also be used for other purposes : the intake of fuel and oxidizer through two types of passages so as to better control the flames in so far as their form, nature or composition are concerned.

Thus, the present invention makes it possible to convey a third product through the passages of a third type, this product being intended to react in the flame.

The present invention makes it possible to readily maintain hot sealing of the burner.

In addition, the burner of the present invention is easy to machine when it comprises several blocks or solid elements and it has good resistance to high temperatures for ceramic material elements.

The burner of the present invention may be used for directly preheating the fluids.

The burner of the present invention may be readily cooled in the case of metal parts.

The burner of the invention is perfectly suited to the manufacture of synthetic gases from oxygen and methane.

The burner of the invention may be advantageously applied to the method and device described in the European patent application no. 87 402 929.1 filed on 18 Dec. 1987.

Thus, the present invention relates to a burner of a synthesis gas producing reactor for conveying at least two fluids separately to a reaction zone of the reactor, one serving as fuel and the other as combustive gas. This burner is characterized in that it comprises at least one solid element in which holes or passages are provided penetrating to different depths, these holes opening at one of their ends into the reaction zone of the reactor and at the other either into fuel feed means or into oxidizer feed means depending on the fluid conveyed through the hole considered.

At least one group or assembly of passages for feeding the same fluid may open at the same depth in the feed means concerned.

One of the feed means may comprise a chamber partially defined by one of the faces of the solid element.

One of the feed means may comprise a network of channels, joining together, through the solid element, at least some of the holes conveying the same fluid.

The network of channels may comprise passages which communicate together substantially in the vicinity of the central part of the solid element.

The solid element portion of the burner may comprise several superimposed solid blocks or elements fitted together.

At least one of the solid elements may comprise grooves or notches for feeding at least some of the fluid conveying passages.

The solid element may comprise a circuit for the circulation of a heat-carrying fluid or coolant, e.g., A heat transfer medium.

Some at least of the passages may be formed by bores.

The burner may comprise a ceramic material.

BRIEF DESCRIPTION OF THE DRAWINGS

The present invention will be better understood and these advantages will be clearer from the following description of particular examples, which are in no wise limitative, illustrated by the accompanying figures in which:

FIG. 1 shows schematically a burner conveying two fluids separately to the reaction zone, FIG. 2 concerns the case where three fluids are conveyed, FIG. 3 illustrates schematically a case where the burner conveys two fluids to the reaction zone and where it comprises a circuit for the circulation of a cooling fluid, FIGS. 4 and 5 show the case of a burner comprising at least two blocks and grooves, FIGS. 6, 7 and 8 show the case of a burner comprising at least two blocks assembled together by studs, FIGS. 9, 10, 11 and 12 show a burner with three blocks for conveying three different fluids to the reaction zone.

DESCRIPTION OF THE PREFERRED EMBODIMENTS

Figure 11:
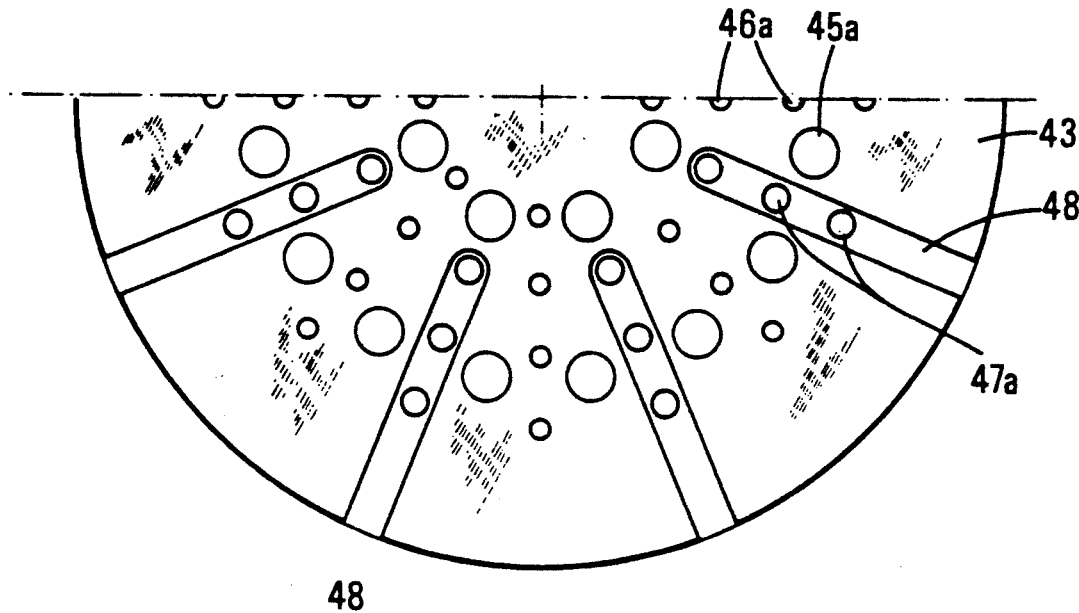

The reference 1 in FIG. 1 designates a burner in its entirety.

This burner comprises a housing 2 in which is placed a solid element 3 which in which there are formed different gas passages or holes.

In FIG. 1, the solid element comprises holes 4 for conveying a first fluid and holes 5 for conveying a second fluid. These holes convey the gases towards a reaction zone 10.

In the case of FIG. 1, housing 2 comprises at its lower part a truncated cone shape 6 which defines with the solid element 3 a chamber 7 which may serve as chamber for feeding holes 4 with a first fluid. Conduit 8 feeds chamber 8 with a first fluid.

Of course, this chamber 7 may have other forms than the truncated cone shape.

The solid element 3 rests, in the case of FIG. 1, on an abutment surface 9 which may be formed, still in the case of FIG. 1, by the upper peripheral zone of the truncated cone shape chamber 7.

Holes 4 conveying the first fluid pass through the solid element 3 from one side to the other thus allowing the transfer of the fluid between the truncated cone shaped chamber and the reaction zone 10.

Holes 5 for conveying the second fluid extend from the reaction zone 10 to an intermediate level 11. In the case of FIG. 1, all the holes 5 stop more or less at the intermediate level.

These holes 5 communicate together through transverse channels or holes 12.

Of course, these transverse holes 12 do not pass through the holes 4 conveying the first fluid.

In the case of FIG. 1, the transverse holes 12 communicate with a chamber 13 which may be annular particularly in the case where housing 2 advantageously has a cylindrical shape.

This chamber 13 is fed with a second fluid through conduit 14.

Sealing between the first fluid supply circuit and the second fluid supply circuit may be provided by the precision of fitting the solid element 3 in housing 2 or by the use of seals, or even by welding.

FIG. 2 shows another example which differs from the preceding example in that it comprises holes 15 for conveying a third fluid.

Holes 15 are fed by a chamber 17 of the same type as chamber 13 but situated at another level.

Holes 15 stop at an intermediate level 16 different from level 11 of the intermediate chamber 13.

This chamber 17 communicates with holes 15 through transverse channels or holes 18.

Of course, the circuits of the first, second and third fluids do not intersect but all three open into the reaction zone 10.

Reference 19 designates the conduit feeding chamber 17 with the third fluid.

As has already been mentioned, sealing between the different circuits is provided either by precise fitting of element 3 in housing 2 or by the use of seals or even by welding.

Reference 20 designates a flange for holding the solid element 3 in position.

FIG. 3 concerns a burner which differs from the example corresponding to FIG. 1 by the presence of a cooling circuit.

In FIGS. 1, 2 and 3 the identical parts bear the same references.

The channels or holes 21 are transverse passages which do not communicate with the reaction zone 10.

These channels serve for the circulation of a heat-carrying fluid or coolant.

Such circulation allows the solid element to be cooled or heated.

These channels 21 are fed with heat-carrying fluid from a duct 22. Conduit 23 designates the discharge conduit for the heat-carrying fluid circulating through holes 21.

The heat-carrying fluid holes may be fed from a supply chamber and be emptied by another chamber, these two chambers being separate so that there is effectively circulation of the heat-carrying fluid in the solid element 3.

Of course, the heat-carrying fluid circuit does not communicate with the other circulation circuits.

The solid element 3 may be formed as a single block or by using several superimposed blocks.

In the case where the solid element 3 is made using a single block, the holes conveying the different fluids as well as the transverse holes or channels may be formed by bores.

FIG. 5 illustrates the case of a solid element 3 comprising two superimposed blocks 24 and 25.

FIG. 4 is a partial top view of FIG. 5 which itself is a partial section A—A of FIG. 4.

Holes 26 serve for conveying the first fluid to the reaction zone and holes 27 for conveying the second fluid to this same reaction zone.

Block 24 or upper block comprises holes 27 substantially over the whole of their length and holes 26 over only a part of their length whereas block 25 or lower block comprises only a part of the length of holes 26.

Thus, in this embodiment (FIGS. 4 and 5), when blocks 24 and 25 are assembled together holes 26 appear over their whole length. Of course, blocks 24 and 25 must be assembled together so that there is correspondence between the hole portions 26 contained in the upper block 24 and the portions of these same holes contained in the lower block 25.

Grooves or notches 28 are formed in the upper block 24 at the level of its bearing face 29 with the lower block 25.

In the case of FIGS. 4 and 5, these grooves are perpendicular with each other and provide communication between the different holes 27 conveying the second fluid.

Of course, the form of the grooves and their arrangement may be different from those shown in FIGS. 4 and 5 as long as they allow the different holes conveying the second fluid to be fed from the supply chamber.

Grooves 28 are provided so as not to penetrate into holes 26 conveying the first fluid. Thus, holes 26 are surrounded by a sufficient thickness of material 29.

Of course, the grooves may be formed in the lower block or partially in both blocks without departing from the scope of the present invention.

FIGS. 6 and 7 shows another embodiment.

Reference 30 designates the holes conveying the first fluid and reference 31 the holes conveying the second fluid.

The solid element 32 which comprises these holes 30 and 31 is formed of two blocks 33 and 34, one 34 being placed above the other 33, see FIG. 6.

FIG. 7 shows the upper block 34 in a partial bottom view and FIG. 8 a partial top view of the lower block 33.

The upper block comprises bosses 35 or studs which surround the holes conveying the first fluid over a portion of their length.

When the upper block 34 is placed on the lower block 33, the free zones 36 between bosses 35 define a network of holes 31 conveying the second fluid.

The two blocks 34 and 33 are superimposed so that the portion of the length of the holes conveying the first fluid which are situated in the upper block 34 are opposite the portion of the length of this same hole situated in the lower block 33.

One way of guaranteeing the coincidence of the length portions of the holes conveying the first fluid is to provide, in the lower block 33, recesses 37 into which a part only of bosses 35 penetrates so as to form a sufficient space for the circulation of the second fluid feeding the holes 31 conveying the second fluid.

The supply network defined by the free spaces 36 may be fed from chambers, which may be annular, in the same way as in the case of the example of FIG. 1.

Figure 12:
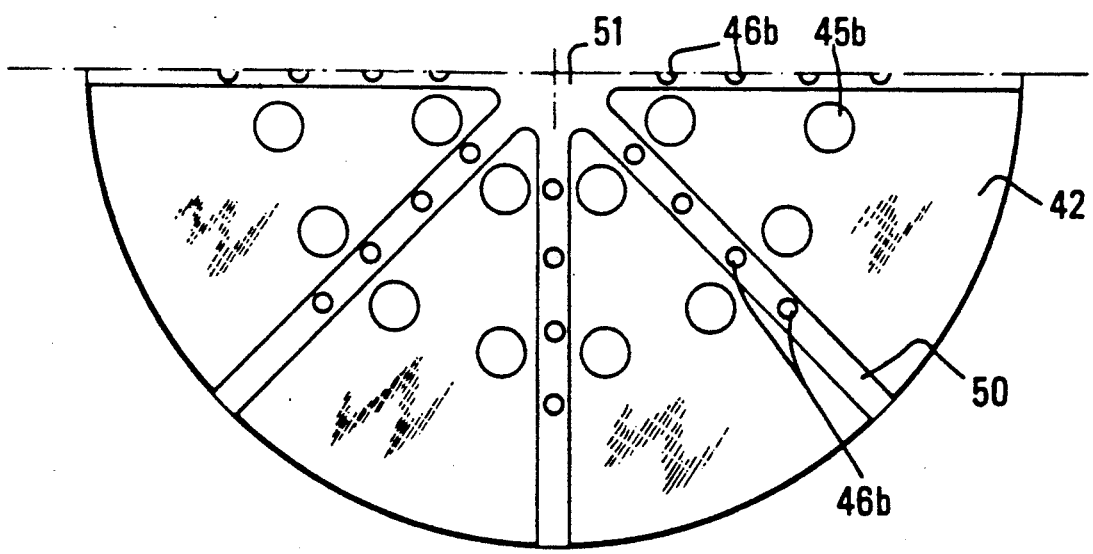

FIGS. 10 and 12 illustrate one embodiment of a burner in which fuels are conveyed separately from three different intakes 38, 39 and 40 and which comprises three blocks 41, 42 and 43 forming the solid element 44. The parts common to FIGS. 10 and 1 to 3 bear the same numerical references. Thus, reference 6 designates the truncated cone shape 7, reference 9 designates the abutment surface for the solid element 44, and reference the holding flange.

The fluids coming through intakes 38, 39 and 40 are designated respectively by first fluid, second fluid and third fluid.

FIG. 9 shows a top view of the burner of FIG. 10 which is itself a sectional view through line BB of FIG. 9.

FIG. 11 is a bottom view of the upper block 43 and FIG. 12 a view of the intermediate block 43.

References 45, 46 and 47 designate respectively the holes conveying the first, second and third fluids.

The upper block 43 comprises the holes 47 conveying the third fluid as well as grooves 48 for feeding these holes 47 from chamber 49. Considering the shape of grooves 48 shown in FIG. 11, chamber 49 must supply all the grooves, which may be obtained by an annular shape of this chamber 49.

In another variant, the upper block 43 may have a shoulder on its lower face into which an intake 49 emerges and defines an annular chamber with a portion of the upper face of the intermediate block and housing 2.

The upper block 43 comprises, over a part 46a of their length, the holes 46 conveying the second fluid. The other part 46b of these holes is placed in the intermediate block 42. Holes 46 are fed through grooves 50 situated on the lower face of the intermediate block 42, see FIG. 12. These grooves form a network for supplying holes 46 from the intake 39 of the second fluid.

In FIG. 12, it can be seen that grooves 50 converge towards the central part 51 of the intermediate block 42.

Thus, the supply chamber 52 may be reduced if required.

The holes 45 conveying the first fluid pass through the solid element 44 from one side to the other. They pass over a part of their length 45a, 45b and 45c respectively through the upper, intermediate and lower blocks and open into chamber7.

Of course, blocks 41, 42 and 43 are located and judiciously positioned during assembly so that holes 45 and 46 are correctly supplied with fluid.

Figure 13:
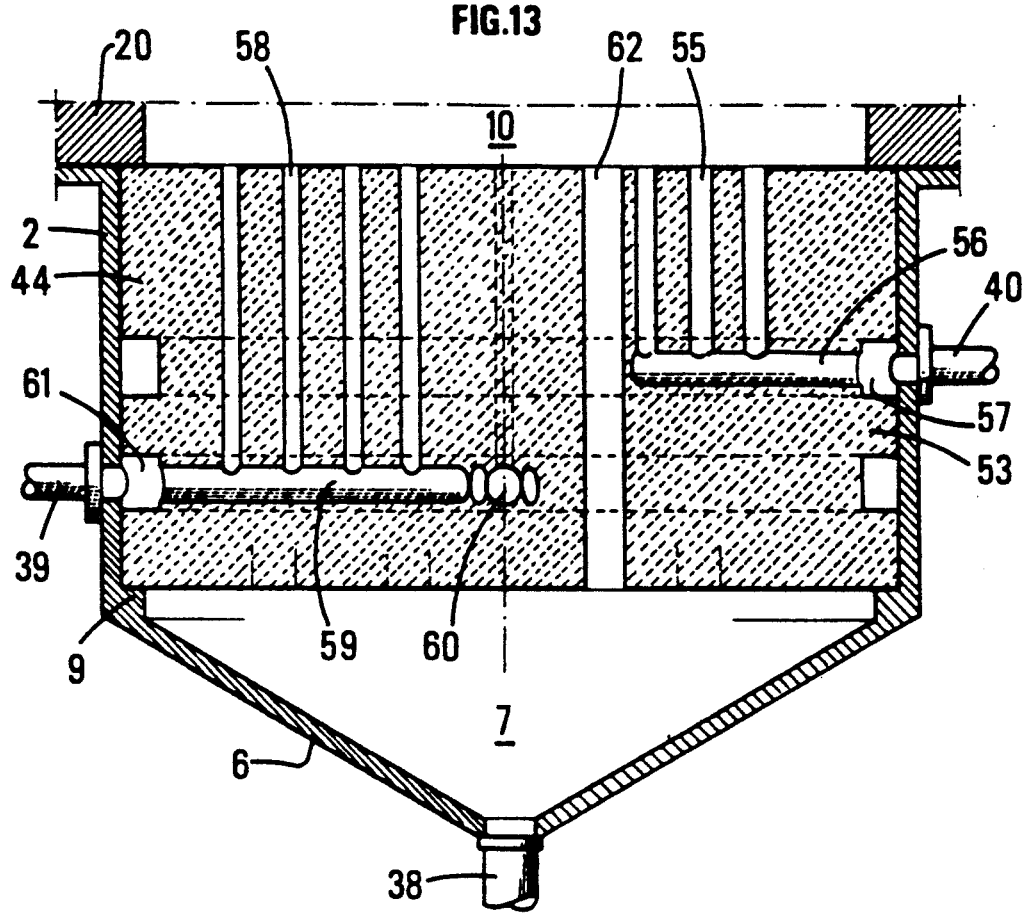
FIG. 13 illustrates a one piece burner for conveying three fluids to the reaction zone.

FIG. 13 shows an embodiment corresponding to that of FIG. 10 but only comprising a single block 53 forming the solid element 54. This element comprises bores 55 forming the holes conveying the third fluid which intersect radial bores 56 supplying these bores 55.

The radial bores open into a groove 57 which is in relation with the intake 40 of the third fluid.

Holes 58 for feeding the second fluid are formed by axial bores which open into radial bores 59 forming the channels supplying holes 58 which they intersect.

The radial bores 59 communicate together either by opening into the central part 60 or through a groove 61 which communicates with the intake 39 of the second fluid.

It is obvious that bores 56 may also be convergent and communicate with each other at the central part of the solid element.

The same goes for grooves 48 in FIG. 10.

Finally, the single block of the solid element 44 shown in FIG. 13 comprises bores 62 which pass completely therethrough and serve as holes conveying the first fluid.

In the embodiments shown in FIGS. 10 and 13, the solid element has a cylindrical shape and the feed holes are generally placed on radial half axes offset with respect to each other so as to avoid interconnection of the holes serving for conveying fluids which should not be mixed before arriving in the reaction zone 10.

It is obvious that without departing from the scope of the present invention, the feed holes may be distributed differently, as long as the fluid supply networks do not communicate with each other. This may be obtained by appropriate lay-outs of the channels supplying the conveying holes, such lay-outs may be readily formed when the solid element is made from a stack of several blocks.

Figure 14:
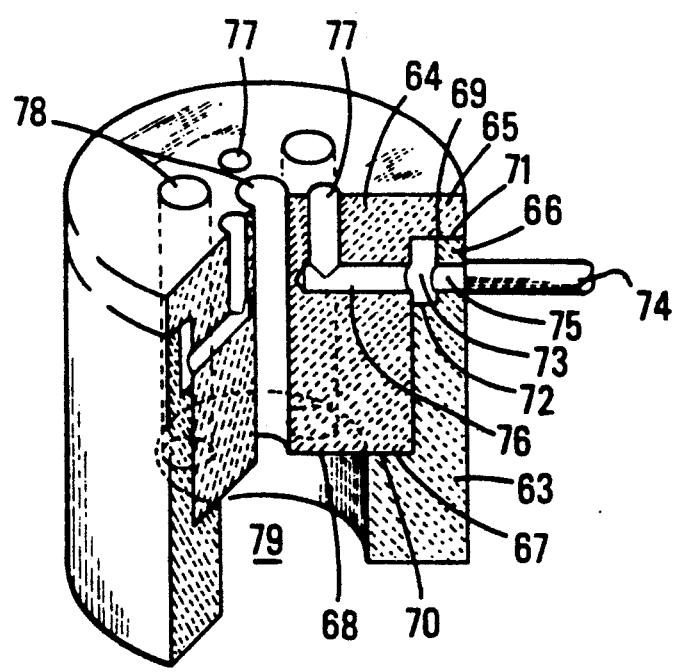
FIG. 14 represents a one piece burner of a relatively simple construction.

FIG. 14 shows a simple embodiment of the device of the present invention.

The burner comprises two parts which are a housing 63 and a solid element 64 with a collar 65 which bears on the upper edge 66 of housing 63.

Furthermore, housing 63 comprises an abutment surface 67 formed by a recess.

The depth to which the recess is provided with respect to the upper edge 66 of housing 63 is such that it corresponds substantially to the height separating the lower face 68 of the solid element from the lower face 69 of collar 65 of this same solid element, with the interpositioning of seals 70 and 71 placed at the contact zones.

The solid element 63 comprises a second recess 72 placed at a level higher than the preceding one so as to form an annular chamber 73 fed through orifice 75 by a duct 74 feeding the second fluid.

The solid element 64 comprises bores 76 which may be radial and which communicate with chamber 73 and with bores 77, which may be substantially axial and form the holes conveying the second fluid.

The solid element 64 comprises axial bores 78 which form the holes conveying the first fluid, this fluid coming from chamber 79 placed under the solid element 64.

This burner is of a particularly simple construction.

Tests have been carried out with a burner corresponding to that of FIG. 14 made from refractory steel, they gave good results and the soot rate was divided by a factor of 10 with respect to a burner comprising tubes and operating under the same conditions.

What is claimed is:

1. A chemical reactor for producing synthesis gas, said reactor comprising a reaction zone and a burner, said burner having means for separately conveying at least two reactive fluids to the reaction zone of the reactor, one fluid comprising a fuel and the other fluid comprising an oxidizer, said means for separately conveying the at least two fluids comprising a solid element which comprises at least one solid block and in which at least two groups of a plurality of passages are arranged, each group penetrating the solid element at different levels along a longitudinal axis of said element and each group including passages opening at one of their ends into the reaction zone and at the other end into a supply means for supplying one of the at least two reactive fluids, respectively; the passages within said solid element being formed by bores extending longitudinally through said solid element; said burner further comprising a housing which surrounds at least two faces of the solid element and which contacts at least one of said two faces, one of said faces being exposed within said housing and, together with a portion of said housing, defining a chamber forming a supply means for one of said groups of passages.

2. The reactor according to claim 1 wherein said solid element comprises a plurality of solid blocks fitted together.

3. A burner of a reactor for producing synthesis gas, said burner comprising means for separately conveying at least two reactive fluids to a reaction zone of the reactor, one fluid comprising a fuel and the other fluid comprising an oxidizer, said means for separately conveying the at least two fluids comprising a solid element in which at least two groups of a plurality of passages are arranged, each group penetrating the solid element at different levels along the longitudinal axis of the solid element and each group including passages opening at one of their ends into the reaction zone and at the other end into a supply means for supplying one of the at least two reactive fluids, respectively; said solid element comprising a plurality of superimposed solid blocks fitted together and at least one of said blocks comprises grooves or notches which are operatively associated with a face of another block to form channels for supplying at least some of the fluid conveying passages with a fluid.

4. A burner of a reactor for producing synthesis gas, said burner comprising means for separately conveying at least two reactive fluids to a reaction zone of the reactor, one fluid comprising a fuel and the other fluid comprising an oxidizer, said means for separately conveying the at least two fluids comprising a solid element in which at least two groups of a plurality of passages are arranged, each group penetrating the solid element at different levels along a longitudinal axis of the solid element and each group including passages opening at one of their ends into the reaction zone and at the other end into a supply means for supplying one of the at least two reactive fluids, respectively; the passages within said solid element being formed by bores extending longitudinally through said solid element and a housing secured to said solid element, said solid element having an end face exposed within said housing, one of said supply comprising a chamber defined partially by said end face and partially by said housing means, said solid element having a lateral face exposed within said housing and another one of said supply comprising another chamber defined partially by said lateral face and partially by said housing means.

5. The burner according to claim 4, wherein said another chamber comprises an annular chamber extending transversely around said solid element.

* * * * *